US012723968B2

(12) United States Patent
Matsumoto et al.

(10) Patent No.: US 12,723,968 B2
(45) Date of Patent: Sep. 1, 2026

(54) CORROSION MANAGEMENT SYSTEM, ESTIMATION METHOD, AND PROGRAM

(71) Applicant: MITSUBISHI SHIPBUILDING CO., LTD., Kanagawa (JP)

(72) Inventors: Shunsaku Matsumoto, Tokyo (JP); Tadashi Sugimura, Tokyo (JP); Soichiro Inoue, Yokohama (JP); Shin Terada, Yokohama (JP); Satoshi Miyazaki, Yokohama (JP)

(73) Assignee: MITSUBISHI SHIPBUILDING CO., LTD., Yokohama (JP)

( * ) Notice: Subject to any disclaimer, the term of this patent is extended or adjusted under 35 U.S.C. 154(b) by 323 days.

(21) Appl. No.: 18/571,864

(22) PCT Filed: May 18, 2022

(86) PCT No.: PCT/JP2022/020671
§ 371 (c)(1),
(2) Date: Dec. 19, 2023

(87) PCT Pub. No.: WO2023/286445
PCT Pub. Date: Jan. 19, 2023

(65) Prior Publication Data
US 2024/0288358 A1 Aug. 29, 2024

(30) Foreign Application Priority Data
Jul. 12, 2021 (JP) ................................ 2021-114897

(51) Int. Cl.
*G01N 17/00* (2006.01)

(52) U.S. Cl.
CPC .................................. *G01N 17/00* (2013.01)

(58) Field of Classification Search
CPC ..................................................... G01N 17/00
See application file for complete search history.

(56) References Cited

U.S. PATENT DOCUMENTS

2010/0030491 A1* 2/2010 Ziegel .................... G01B 17/02 702/179
2017/0010591 A1 1/2017 Fujii
(Continued)

FOREIGN PATENT DOCUMENTS

JP 2002328085 A 11/2002
JP 2003254892 A 9/2003
(Continued)

OTHER PUBLICATIONS

Hiroshi Sone et al., Evaluation of Thickness Diminution in Steel Plates for the Assessment of Structural Condition of Ships in Service, NK Technical bulletin, vol. 21, 2003, pp. 55-71.
(Continued)

*Primary Examiner* — Eric S. McCall
(74) *Attorney, Agent, or Firm* — HAUPTMAN HAM, LLP

(57) ABSTRACT

There is provided a corrosion management system including: a measurement data acquisition unit that acquires measurement data indicating the corrosion state of a first portion of a structure which is an evaluation target; and a corrosion estimation unit that estimates the corrosion state of a second portion of the evaluation target based on the relational expression between the corrosion state of the first portion and the corrosion state of the second portion, and the measurement data of the first portion.

15 Claims, 6 Drawing Sheets

(56) References Cited

U.S. PATENT DOCUMENTS

| | | | | |
|---|---|---|---|---|
| 2017/0030850 | A1* | 2/2017 | Castaneda-Lopez | G01N 27/20 |
| 2021/0199561 | A1* | 7/2021 | Oki | G01N 27/26 |
| 2021/0215594 | A1* | 7/2021 | Mineta | G06N 20/00 |
| 2022/0390354 | A1* | 12/2022 | Oki | G01N 17/006 |
| 2022/0404264 | A1* | 12/2022 | Mineta | G01N 17/006 |
| 2024/0085309 | A1* | 3/2024 | Thompson | G01N 17/00 |
| 2024/0201161 | A1* | 6/2024 | Mineta | G01N 17/00 |
| 2024/0402069 | A1* | 12/2024 | Mineta | G01N 17/00 |
| 2024/0410817 | A1* | 12/2024 | Oki | G01N 17/00 |
| 2025/0130151 | A1* | 4/2025 | Oki | G01N 15/0211 |
| 2025/0314579 | A1* | 10/2025 | Oki | G01N 17/00 |

FOREIGN PATENT DOCUMENTS

| | | | |
|---|---|---|---|
| JP | 4706279 | B2 | 6/2011 |
| JP | 2016224000 | A | 12/2016 |
| JP | 2018017704 | A | 2/2018 |
| KR | 1020160125461 | A | 10/2016 |
| KR | 102216306 | B1 | 2/2021 |

OTHER PUBLICATIONS

International Search Report and Written Opinion of International Application No. PCT/JP2022/020671 mailed Aug. 9, 2022; 12pp.

* cited by examiner

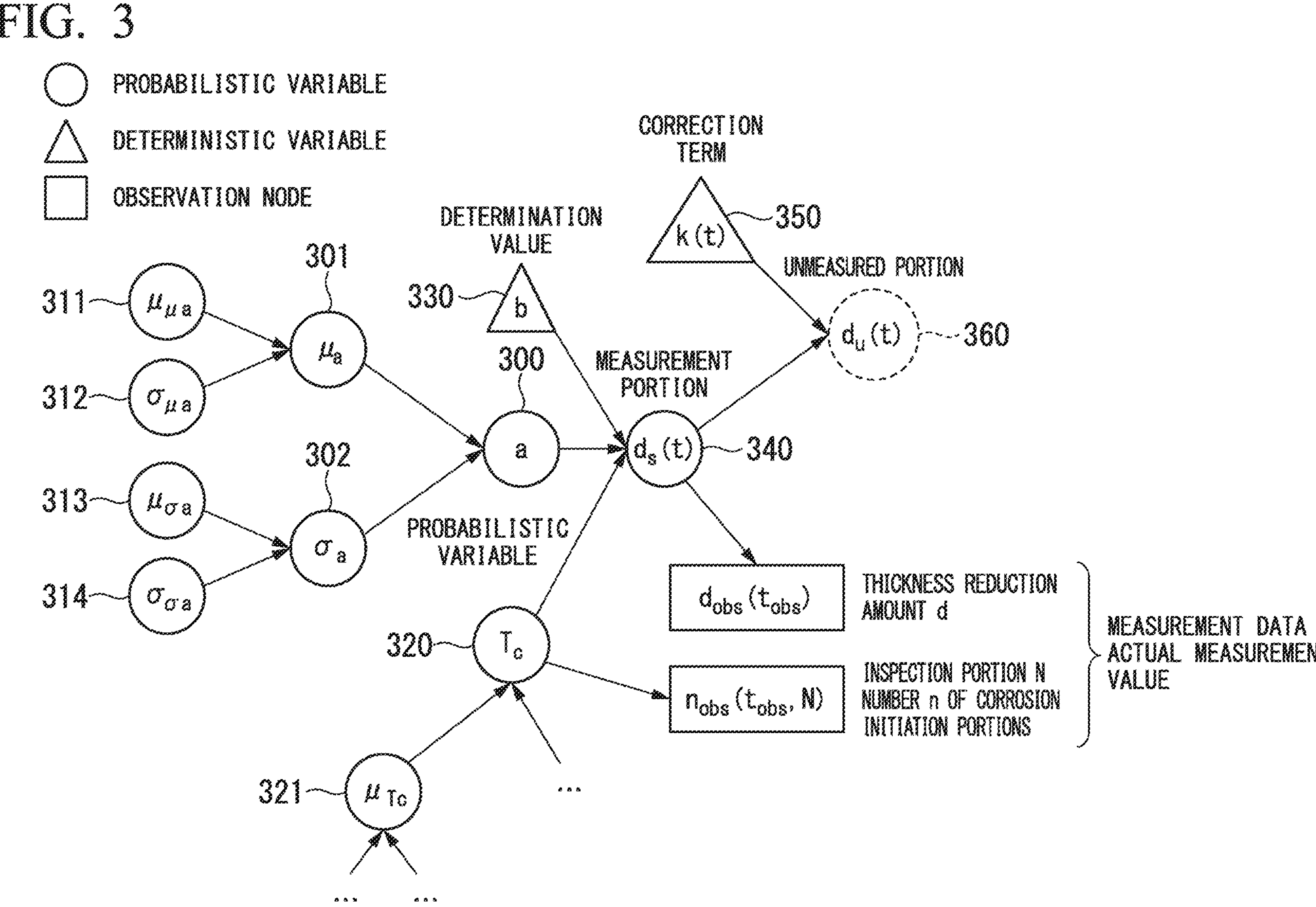
FIG. 3
PROBABILISTIC VARIABLE
DETERMINISTIC VARIABLE
OBSERVATION NODE
311
312
313
314
$\mu_{\mu a}$
$\sigma_{\mu a}$
$\mu_{\sigma a}$
$\sigma_{\sigma a}$
301
$\mu_a$
302
$\sigma_a$
DETERMINATION VALUE
330
b
300
a
PROBABILISTIC VARIABLE
320
$T_c$
321
$\mu_{Tc}$
MEASUREMENT PORTION
$d_s(t)$
340
CORRECTION TERM
k(t)
350
UNMEASURED PORTION
$d_u(t)$
360
$d_{obs}(t_{obs})$
THICKNESS REDUCTION AMOUNT d
$n_{obs}(t_{obs}, N)$
INSPECTION PORTION N
NUMBER n OF CORROSION INITIATION PORTIONS
MEASUREMENT DATA
ACTUAL MEASUREMENT VALUE

CORROSION MANAGEMENT SYSTEM, ESTIMATION METHOD, AND PROGRAM

RELATED APPLICATIONS

The present application is a National Phase of International Application Number PCT/JP2022/020671 filed May 18, 2022 and claims priority to Japanese Application Number 2021-114897 filed Jul. 12, 2021.

TECHNICAL FIELD

The present disclosure relates to a corrosion management system, an estimation method, and a program. Priority is claimed on Japanese Patent Application No. 2021-114897, filed Jul. 12, 2021, the content of which is incorporated herein by reference.

BACKGROUND ART

In order to maintain integrity of structures in many fields such as vessels, chemical plants, and thermal power plants, measures against corrosion have become an important issue. Thickness reduction due to corrosion is a phenomenon with a large variation, and inference based on probability statistics is used. In a case of predicting a corrosion state, a two-stage corrosion model in consideration of corrosion initiation and corrosion progress, or a three-stage corrosion model in consideration of a transition from corrosion initiation to progressive corrosion between corrosion initiation and corrosion progress is used.

To predict a corrosion progress amount (thickness reduction amount) of a steel, a power law $Y=AX^B$ (Y represents a corrosion amount, X represents a time, and A and B are coefficients depending on a material and an environment) is generally used. As a method for determining the coefficients A and B, there are (1) a method of estimating an observable physical quantity as an explanatory variable and (2) a method of directly estimating the coefficients from values obtained in an experiment or an actual measurement.

Patent Document 1 discloses a method of obtaining a corrosion amount by probabilistic inference using, as explanatory variables, a temperature, a relative humidity, an amount of flying salt, and a wettability probability at an installation location of a bridge. The method disclosed in Patent Document 1 cannot be used unless the explanatory variables are clear. However, the explanatory variables may not be obtained for convenience of measurement. For example, in a large structure, an area where a sensor is not provided is generally present. A normal sensor cannot be provided in an explosion proof area. In a case where measurement values of such an area are included in the explanatory variables, the method of Patent Document 1 cannot be used. In the method of Patent Document 1, in a case where the explanatory variables increase, there is a possibility that a standard error in the corrosion amount estimation increases due to adjustment of the degree of freedom of regression.

In a method described in Non-Patent Document 1, a large amount of measurement data acquired from each portion of a hull is used to adjust the coefficient of a three-stage corrosion model, and the corrosion initiation life and the corrosion amount during a certain period are probabilistically estimated. However, in corrosion inspection and corrosion measurement of a large structure such as a vessel, from the viewpoints of time, cost, safety, and the like including accessibility, in many cases, it is difficult to acquire, for all structural members, sufficient measurement data for statistical inference. There is the following risks related to the measurement data of a single structural member of a large structure. (1) Since the sample size for inspection and measurement is small (the number of samples that can be collected is small), a statistical distribution tendency cannot be recognized. (2) There is a bias in inspection and measurement, and a target portion cannot be represented. (3) There is a measurement error due to a work environment, characteristics of an inspection tool, ability of a worker, and the like. (4) Even in a case where data is accumulated for a certain structure, the data may not effective for structures with different conditions such as environments and operations.

CITATION LIST

Patent Document

[Patent Document 1]
Japanese Patent No. 4706279

Non-Patent Document

[Non-Patent Document 1]
Hiroshi Sone et al., Evaluation of thickness diminution in steel plates for the assessment of structural condition of ships in service, NK Technical bulletin vol. 21, 2003

SUMMARY OF INVENTION

Technical Problem

For some reason, there is a demand for a method capable of estimating a corrosion state of a portion where results of corrosion inspection and corrosion measurement cannot be obtained.

The present disclosure provides a corrosion management system, an estimation method, and a program capable of solving the above problems.

Solution to Problem

According to the present disclosure, there is provided a corrosion management system including: a measurement data acquisition unit that acquires measurement data indicating a corrosion state of a first portion of a structure which is an evaluation target; and a corrosion estimation unit that estimates a corrosion state of a second portion of the evaluation target based on a relational expression between the corrosion state of the first portion and the corrosion state of the second portion, and the measurement data of the first portion.

According to the present disclosure, there is provided an estimation method including: a step of acquiring measurement data indicating a corrosion state of a first portion of a structure which is an evaluation target; and a step of estimating a corrosion state of a second portion of the evaluation target based on a relational expression between the corrosion state of the first portion and the corrosion state of the second portion, and the measurement data of the first portion.

According to the present disclosure, there is provided a program causing a computer to execute a process including: a step of acquiring measurement data indicating a corrosion state of a first portion of a structure which is an evaluation target; and a step of estimating a corrosion state of a second portion of the evaluation target based on a relational expression between the corrosion state of the first portion and the corrosion state of the second portion, and the measurement data of the first portion.

Advantageous Effects of Invention

According to the corrosion management system, the estimation method, and the program described above, it is possible to estimate a corrosion state of an unmeasured point. It is possible to create an effective maintenance plan to deal with the estimated corrosion.

BRIEF DESCRIPTION OF DRAWINGS

FIG. 3 is a diagram showing corrosion correction processing of a measurement portion according to the embodiment.

DESCRIPTION OF EMBODIMENTS

Embodiment

Hereinafter, a corrosion management system of the present disclosure will be described with reference to FIG. 1 to FIG. 7.

(System Configuration)

Figure 1:
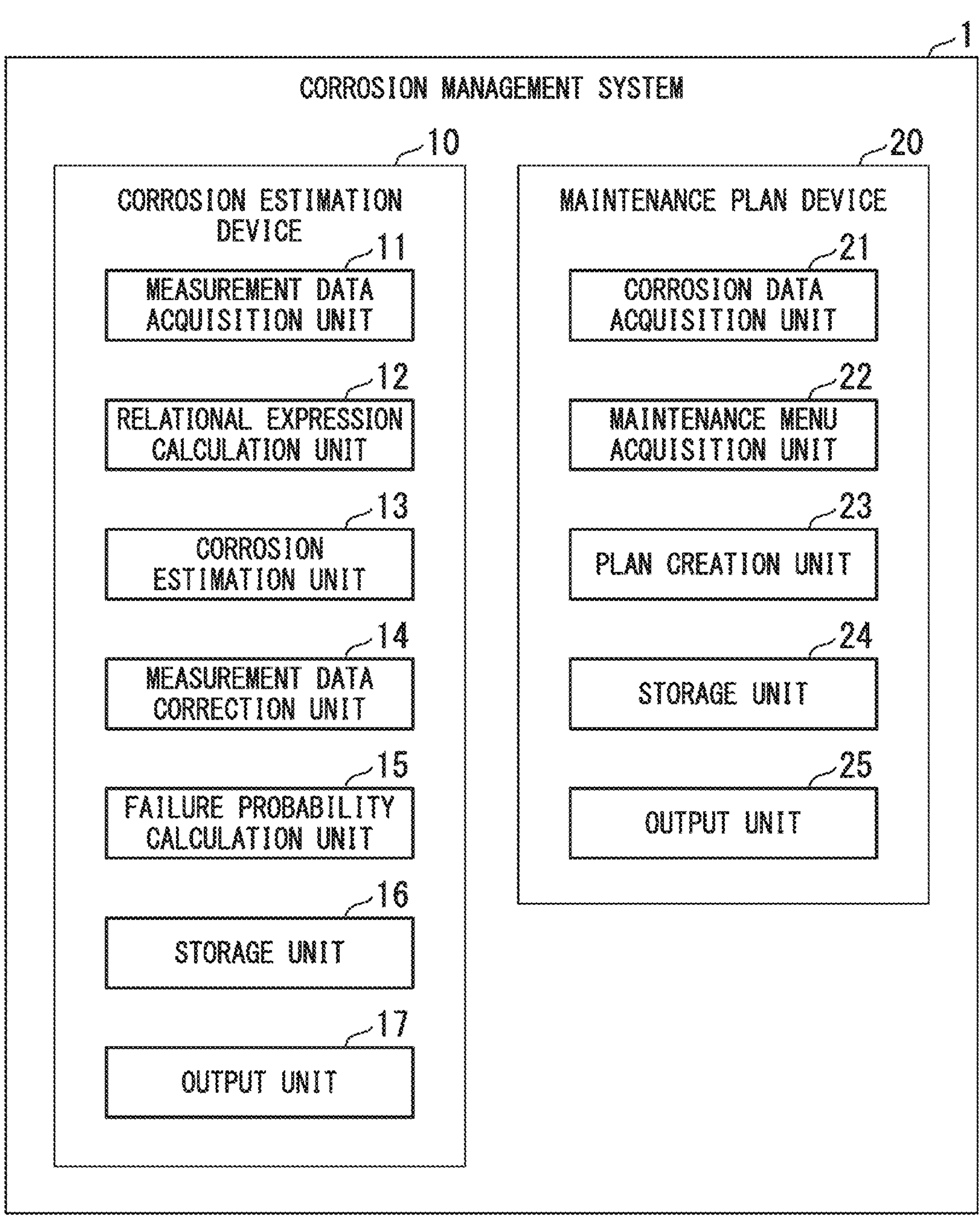
FIG. 1 is a block diagram showing an example of a corrosion management system according to an embodiment.

FIG. 1 is a block diagram showing an example of a corrosion management system according to an embodiment.

A corrosion management system 1 estimates a corrosion state of a floating structure such as a vessel, various facilities such as a chemical plant, and a structure in a machine, further predicts a probability of a failure that will be caused by corrosion in the future, and creates an effective maintenance plan to deal with the failure. In a case of a structure for which corrosion is an issue, corrosion inspection and corrosion measurement are performed. However, for example, in a large structure such as a vessel, it is not always possible to inspect or measure all of the attention portions. On the other hand, in a case where sufficient inspection data is not available for an evaluation target, or for a portion where inspection data is not frequently obtained, the corrosion management system 1 acquires the corrosion initiation life (a time until corrosion occurs) of each portion and the time-series change of the corrosion amount (thickness reduction amount) of each portion by referring to a past corrosion database, and probabilistically estimates the corrosion initiation life and the corrosion amount from these pieces of data and measurement data related to the evaluation target.

The corrosion management system 1 includes a corrosion estimation device 10 and a maintenance plan device 20. The corrosion estimation device 10 estimates a corrosion state of an unmeasured portion that is an evaluation target. The maintenance plan device 20 creates a maintenance plan against corrosion that optimizes reliability or a cost based on the corrosion state estimated by the corrosion estimation device 10.

(Configuration of Corrosion Estimation Device)

The corrosion estimation device 10 includes a measurement data acquisition unit 11, a relational expression calculation unit 12, a corrosion estimation unit 13, a measurement data correction unit 14, a failure probability calculation unit 15, a storage unit 16, and an output unit 17.

The measurement data acquisition unit 11 acquires measurement data that is information indicating a corrosion state obtained by inspecting and measuring a structure that is an evaluation target. The measurement data includes information such as the presence or absence of corrosion and a thickness reduction amount. The structure that is an evaluation target is not limited. In the following description, it is assumed that the evaluation target is a vessel H as an example. It is assumed that a portion for which measurement data is obtained is a portion S and a portion for which measurement data is not obtained but corrosion evaluation is to be performed is a portion U. Here, the portion is a structure having a certain size, such as an upper deck, a side shell, a ballast water tank, an oil tank, and the like of the vessel H.

The relational expression calculation unit 12 calculates a relationship between the portion U and the portion S from pieces of past measurement data of the portion U and the portion S of another vessel. The relational expression calculation unit 12 calculates a relational expression of a corrosion initiation life that indicates a relationship between a period until corrosion occurs at the portion U and a period until corrosion occurs at the portion S, and a relational expression of a corrosion amount that indicates a relationship between a corrosion amount (thickness reduction amount) of the portion U and a corrosion amount of the portion S at a time T. The corrosion initiation life and the corrosion amount have variations depending on the actual measurement position even in the portion S. The relationship related to corrosion between the portion U and the portion S is also different between the vessel 1 and the vessel 2 for which pieces of measurement data for the portion U and the portion S are both obtained. Therefore, the relational expression calculation unit 12 calculates a relational expression of the corrosion initiation life and a relational expression of the corrosion amount that include these uncertainties.

Next, these relational expressions will be described with reference to FIG. 2A and FIG. 2B.

For many marine structures such as vessels, a corrosion database of each member is provided based on results of past corrosion inspection. Pieces of data on various vessels are registered in the corrosion database, and include data including differences in all kinds of structures and usage environments.

The corrosion database stores the following information (parameter) analyzed based on measurement data which is measured for each portion.

Probability database of corrosion initiation life Tc . . . . For example, a logarithmic mean and a logarithmic standard deviation of a corrosion initiation life Tc are registered.

Probability database of corrosion progress parameter a . . . . For example, a logarithmic mean and a logarithmic standard deviation of a corrosion progress parameter a are registered.

Database of corrosion progress parameter b . . . b is, for example, a fixed value determined for each material or each portion (place, environment). b may be a probability variable.

The corrosion progress parameters a and b are A and B of the above-described power law $Y=AX^B$. In a case where Tc, a, and b are used, a corrosion amount d(t) at a certain time t (t>Tc) is expressed by the following equation (1).

$$d(t) = a \times (t - Tc)^b \tag{1}$$

The relational expression of corrosion is created for each of the corrosion initiation life Tc and the corrosion amount d(t) based on the past corrosion database. For the relational expression of the corrosion amount, a time dependency is taken into consideration.

Figure 2A:
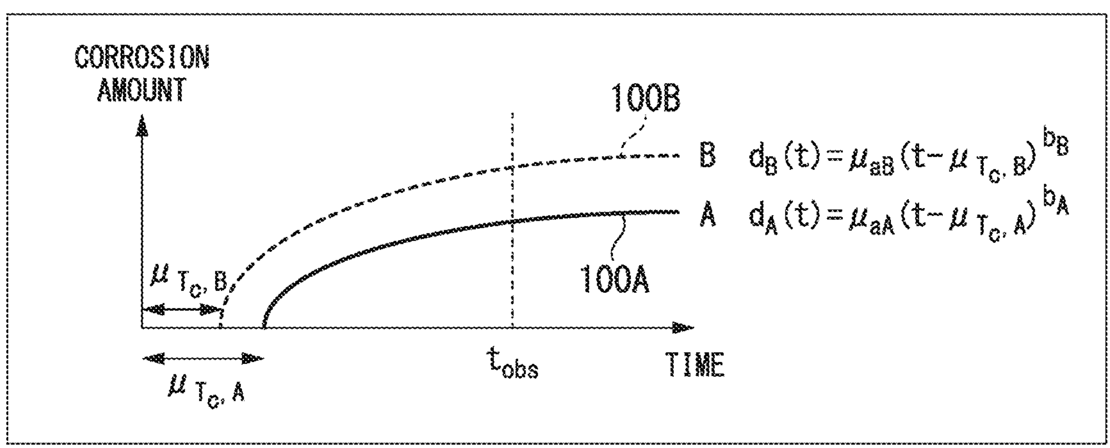
FIG. 2A is a first diagram showing relational expressions used for estimation of corrosion according to the embodiment.

FIG. 2A shows graphs representing a relationship between each of median values ($\mu_{Tc,\ A}$, $\mu_{Tc,\ B}$) of the known corrosion initiation lives Tc of the portion A and the B recorded in the corrosion database and a median value of the corrosion amount d(t) by the equation (1). A graph 100A is a corrosion progress amount graph of the portion A, and a graph 100B is a corrosion progress amount graph of the portion B. $\mu_{Tc,\ A}$ indicates the median value of the corrosion initiation life Tc of the portion A, and $\mu_{Tc,\ B}$ indicates the median value of the corrosion initiation life Tc of the portion B.

Figure 2B:
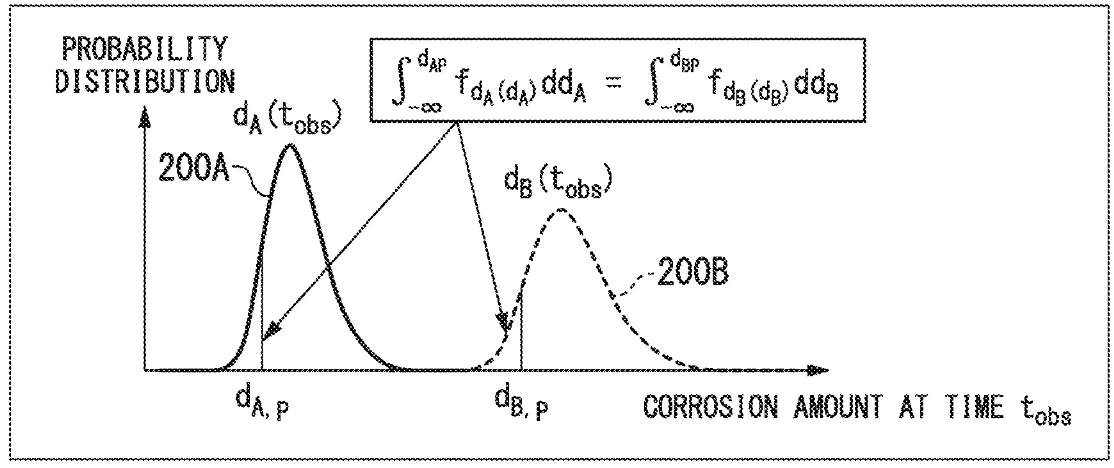
FIG. 2B is a second diagram showing relational expressions used for estimation of corrosion according to the embodiment.

FIG. 2B shows graphs representing probability distributions of the corrosion amounts of the portion A and the portion B at a time $t_{obs}$ based on known Tc, a, b recorded in the corrosion database and the equation (1). A graph 200A is a probability distribution of the corrosion amount of the portion A, and a graph 200B is a probability distribution of the corrosion amount of the portion B. Here, assuming that the corrosion amount of the portion A at the time $t_{obs}$ is $d_{A,\ P}$, a cumulative probability of the corrosion amount $d_{A,\ P}$ is calculated by using a probability distribution of $d_A(t_{obs})$. In the graph 200B, a value that gives the same cumulative probability is a corrosion amount $d_{B,\ P}$ of the portion B at the same time $t_{obs}$.

The relational expression calculation unit 12 formulates the relationship between the portion A and the portion B by an addition rule and a multiplication rule for each of the corrosion initiation life Tc and the corrosion amount d(t).

1. Corrosion Amount d(t)

$$\text{Addition rule: } d_B(t_{obs}) = d_A(t_{obs}) + K1(t_{obs}) \tag{2}$$

$$\text{Multiplication rule: } d_B(t_{obs}) = K2(t_{obs}) \times d_A(t_{obs}) \tag{3}$$

2. Corrosion Initiation Life Tc $$\text{Addition rule: } Tc_B = Tc_A + K3 \tag{4}$$

$$\text{Multiplication rule: } Tc_B = K4 \times Tc_A \tag{5}$$

The correction terms K1 to K4 may be deterministically constant, or may be calculated as probability distributions. In a case where the correction term is probabilistically treated, uncertainty related to the corrosion relationship of the portion is qualitatively set by engineering determination. The correction terms K1 to K4 may be set in consideration of a difference in properties (the material, the size, the environment) between a vessel registered in the corrosion database and the vessel H that is an evaluation target. The values of $d_B(t_{obs})$ and $Tc_B$ calculated by the relational expressions (2) to (5) are also calculated as probability distributions.

In a case of a vessel, values of Tc, a, and b are analyzed for a large number of vessels, and are provided as a known database. There are variations in the pieces of data of the portion S and the portion U that are registered in the corrosion database, for example, depending on a vessel or depending on a position where inspection and measurement are actually performed even on the same portion of the same vessel. However, by using the average value or the median value as shown in FIG. 2A, effects of various corrosion influence factors (coating, environments) and error factors (an inspector's skill, measurement errors) included in the corrosion database are alleviated. From distribution characteristics of the whole corrosion database, the corrosion relationship between the portions is defined, for example, based on an assumption that "in a hull of which the upper deck is likely to corrode, a side shell is also likely to corrode". It is considered that Tc and a (including b in some cases), which are probabilistic parameters calculated under such an assumption, generally include variations between vessels and variations in the same member. By calculating the relational expressions (2) to (5) using the corrosion initiation life Tc and the corrosion progress parameter a, and furthermore, by expressing the correction terms K1 to K4 as a probability distribution (for example, a normal distribution) as necessary, a relational expression that is robust to the variations can be obtained. The relational expression calculation unit 12 calculates the corrosion initiation life and the corrosion progress amount not only in the portion A and the portion B but also in all other portions registered in the corrosion database, and formulates relationships in all combinations of the portions.

The corrosion estimation unit 13 estimates a corrosion state of the evaluation portion U by using the measurement data of the measurement portion S and the relational expressions (2) to (5) of the portion S and the portion U formulated based on the corrosion databases (in the relational expressions described above, the relational expressions in which the portion A corresponds to the portion S and the portion B corresponds to the portion U). For example, the corrosion estimation unit 13 estimates the corrosion initiation life $\mu_{Tc,\ U}$ of the portion U by using either or both of the relational expressions (4) and (5). The corrosion estimation unit 13 estimates the corrosion amount $du(t_{obs})$ of the portion U at $t_{obs}$ by using either or both of the relational expressions (2) and (3). $t_{obs}$ is a time during which corrosion inspection and corrosion measurement are performed on the measurement portion S.

Here, there is a possibility that the following risk may occur in the measurement data of the measurement portion S. (1) A sample size of inspection and measurement is small. (2) There is a bias in actual measurement positions, and the actual measurement positions cannot represent the target portion S. (3) There is a measurement error due to an environment of a measurement position, characteristics of an inspection tool, ability of a worker, and the like. On the other hand, the measurement data correction unit 14 may correct the measurement data in order to improve accuracy of the measurement data of the portion S. In a case where it is considered that the accuracy of the measurement portion S is not sufficient, the measurement data correction unit 14 corrects the measurement data of the measurement portion U by performing, for the measurement portion S, comprehensive evaluation of past results (values that can be calculated from the parameters of the corrosion database and actual measurement values) and the measurement data of the measurement portion S by using a Bayesian method. The comprehensive evaluation method is described in, for example, the 2014 Joint Industry Project (JIP) report "Life Cycle management of Hull Structure JIP". Hereinafter, a method of correcting the measurement data will be described with reference to FIG. 3.

FIG. 3 shows an example of a corrosion relational expression model. In the model of FIG. 3, the corrosion progress parameter a (300) is represented by probability parameters $\mu_a$ (301) and $\sigma_a$ (302), the probability parameter $\mu_a$ (301) is represented by $\mu_{\mu a}$ (311) and $\sigma_{\mu a}$ (312), and the probability parameter $\sigma_a$ (302) is a probability model represented by $\mu_{\sigma a}$ (313) and $\sigma_{\sigma a}$ (314). Here, in the corrosion progress parameter a (300), the probability parameter $\mu_a$ (301) is a logarithmic mean of a, and $\sigma_a$ (302) is a logarithmic standard deviation of a. Similarly, $\mu_{\mu a}$ (311) is a logarithmic mean of $\mu_a$(301), and $\sigma_{\mu a}$ (312) is a logarithmic standard deviation of $\mu_a$ (301). The corrosion initiation life Tc (320) is also represented by a probability model (not shown) using the same parameters such as $\mu_{Tc}$ (321). The measurement data correction unit 14 provides, for the corrosion amount ds(t) (340) of the measurement portion S of the correction model, the measurement data, which is actually measured at the measurement portion S of the vessel H that is an evaluation target, and the past results of other vessels at the same portion S. The measurement data correction unit 14 provides, for the corrosion initiation life Tc (340), the measurement data, which is actually measured at the measurement portion S of the vessel H, and the past results of other vessels at the same portion S. In addition, the measurement data correction unit 14 obtains parameters a and Tc with high accuracy by adjusting values of the parameters 301 to 302, 311 to 314, and 321 according to a framework of Bayesian inference, and obtains corrected d(t) 340 at the measurement portion S based on the comprehensive evaluation using the past results and the measurement data, by the equation (1).

In addition, the corrosion estimation unit 13 estimates a corrosion amount $d_u$(t) (360) of the unmeasured portion U by using the corrected ds(t) (340), the correction term (350), and the equations (4) and (5).

The failure probability calculation unit 15 probabilistically predicts a corrosion state of the evaluation portion U estimated by the corrosion estimation unit 13, by general uncertainty progress calculation. The failure probability calculation unit 15 predicts the corrosion state after 1 year, 2 years, . . . , 10 years later, and, while changing the probability parameters, and calculates the probability (a failure probability) that the corrosion amount after X years will reach a corrosion amount that can be considered to be a failure.

The storage unit 16 stores pieces of the measurement data related to corrosion of various vessels, the corrosion initiation life Tc, the corrosion database in which the corrosion progress parameters a and b are registered, and the like.

The output unit 17 outputs information such as the corrosion initiation life Tc, the corrosion amount d(t), the failure probability, and the like, which are estimated for the evaluation portion U, to a display device or as an electronic file.

(Operation of Corrosion Estimation Device)

Next, a flow of corrosion estimation processing for the unmeasured portion will be described.

Figure 4:
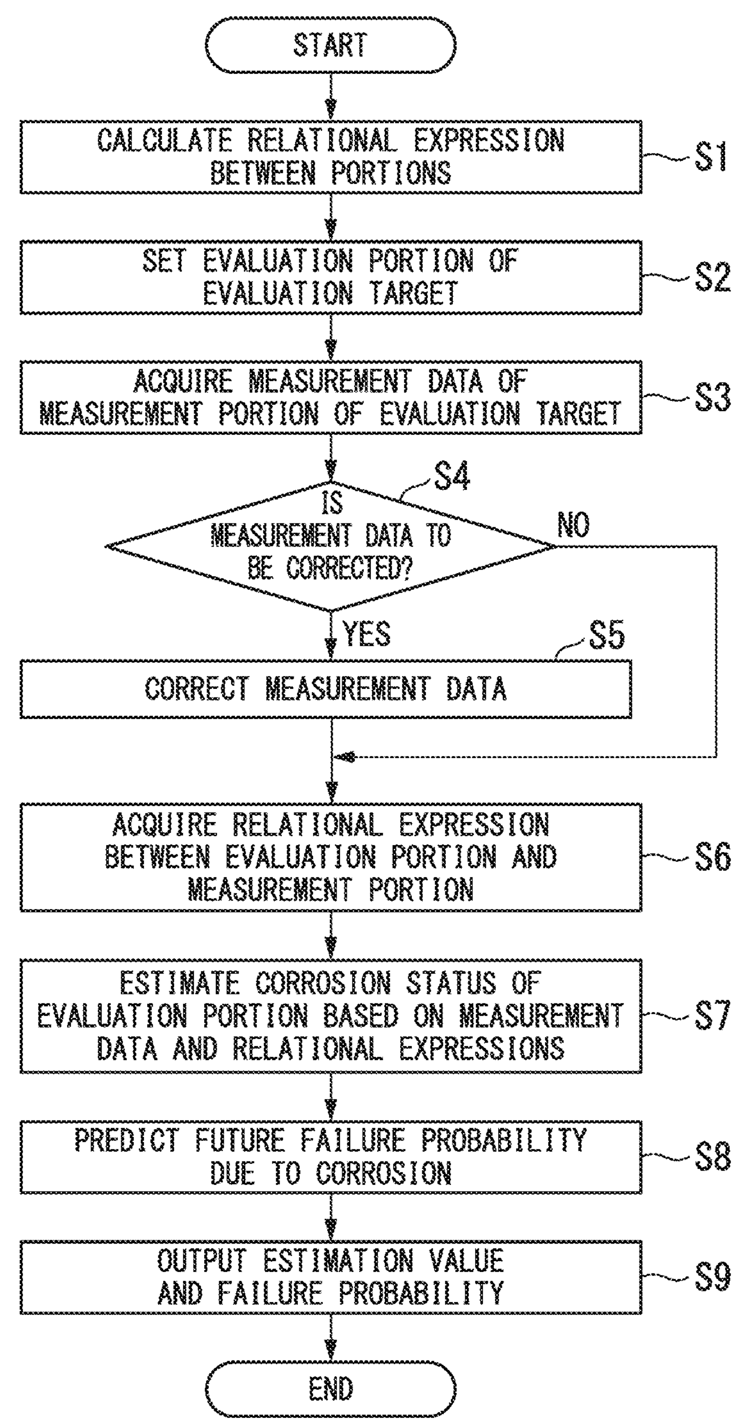
FIG. 4 is a flowchart showing an example of corrosion estimation processing for an unmeasured portion according to the embodiment.

FIG. 4 is a flowchart showing an example of corrosion estimation processing for the unmeasured portion according to the embodiment.

First, the relational expression calculation unit 12 calculates a relational expression between the portions (step S1). The relational expression calculation unit 12 calculates the corrosion relational expressions (2) to (5) based on Tc, a, and b registered in the corrosion database. The relational expression calculation unit 12 records the calculated relational expressions in the storage unit 16. Next, an evaluation portion that is an evaluation target is set (step S2). For example, a user inputs an evaluation portion U (for example, an upper deck) of the vessel H to the corrosion estimation device 10. The corrosion estimation device 10 acquires information related to the input portion U, and records the acquired information in the storage unit 16. Next, the user inputs the measurement data of the measurement portion S to the corrosion estimation device 10. The measurement data acquisition unit 11 acquires the measurement data (the presence or absence of corrosion, a corrosion amount) of the measurement portion S and information (for example, a side shell) of the measurement portion S (step S3), and then records the measurement data and the information of the measurement portion S in associated with each other in the storage unit 16.

Next, the measurement data correction unit 14 determines whether or not to correct the input measurement data of the measurement portion S (step S4). For example, in a case where reliability of the measurement data of the measurement portion S is low (such a case where a measurement error of the portion S measured by a plurality of workers is larger than a threshold value), the user inputs information indicating that reliability of the measurement data is low to the corrosion estimation device 10. The measurement data correction unit 14 determines to correct the measurement data of the vessel H in a case where the information indicating that reliability is low is input, and determines not to correct the measurement data of the vessel H in a case where the information indicating that reliability is high is input. In a case where it is determined not to correct the measurement data (No in step S4), the process proceeds to processing of step S6.

In a case where it is determined to correct the measurement data (Yes in step S4), the measurement data correction unit 14 corrects the measurement data (step S5). As described with reference to FIG. 3, the measurement data correction unit 14 probabilistically calculates parameters such as $\mu_a$ based on the measurement data and the result values, for the corrosion amount $dt_s$(t) modeled using the parameters a, Tc, $\mu_a$, and the like. In addition, the measurement data correction unit 14 calculates the corrosion amount $dt_s(t)$, which is corrected measurement data, by using the calculated parameters.

Next, the corrosion estimation unit 13 calculates a relational expression between the evaluation portion and the measurement portion from the relational expressions created in step S1 (step S6). The corrosion estimation unit 13 reads, from the storage unit 16, the relational expressions (2) to (5) for calculating a corrosion state of the portion U from the portion S. Next, the corrosion estimation unit 13 estimates a corrosion status of the evaluation portion based on the measurement data and the relational expressions (step S7). The corrosion estimation unit 13 estimates the corrosion initiation life $\mu_{TCU}$ of the evaluation portion U by using the measurement data or the corrected measurement data, and the relational expression (4) based on the addition rule. The corrosion estimation unit 13 estimates the corrosion initiation life $\mu_{TCU}$ by using the measurement data or the corrected measurement data, and the relational expression (5) based on the multiplication rule. Similarly, the corrosion estimation unit 13 calculates two estimation values for the corrosion amount $dt_U(t)$ based on the measurement data or the corrected measurement data, and the relational expression (1) and the relational expression (2). The corrosion estimation unit 13 records the calculated estimation value of the corrosion state of the evaluation portion U in the storage unit 16. All of the estimation values estimated by the addition rule and the subtraction rule can be used as values indicating the corrosion state of the portion U. For example, among four estimation values (here, each of the estimation values is probabilistically represented), in a case where the value is extremely large as compared with the value of the portion S, the estimation value may not be used. For example, in a case where the corrosion amount of the portion U is larger than the corrosion amount of the portion S by a predetermined number of times or more (for example, 100 times or more), the corrosion estimation unit 13 determines that the value is likely to be inaccurate estimation. In this case, the corrosion estimation unit 13 may add unavailability flag information to the estimation value, and record the estimation value in the storage unit 16.

Next, the failure probability calculation unit 15 predicts a future failure probability due to corrosion (step S8). A description is given with reference to FIG. 6. For example, the failure probability calculation unit 15 calculates a future corrosion amount based on $d_s(t)$ calculated by varying, for the corrosion amount $d_u(t)$ (360) of the evaluation portion U in FIG. 6, the parameter a (300) and the parameter Tc (320) within a predetermined range. For example, the failure probability calculation unit 15 sets the parameter a (300) and the parameter Tc (320) to values a1 and Tc1, calculates a corrosion amount dS(t) for each year from 1 year later to 20 years later, and calculates a corrosion amount $d_U(t)$ based on the corrosion amount $d_S(t)$ and the relational expressions (1) and (2). The failure probability calculation unit 15 records the corrosion amount $d_U(t)$ for each year. The failure probability calculation unit 15 performs the calculation, for example, several thousands to tens of thousands of times while changing the values of the parameters a (300) and Tc (320). For example, in a case where the calculation is performed on the combinations of the parameters a (300) and Tc (320) 10,000 times and the number of times that the corrosion amount $d_U$(t=10 years) after 10 years is equal to or larger than the threshold value is 5,000 times, the failure probability calculation unit 15 calculates a failure probability of the portion U after 10 years, as 50%. As a method of changing the parameter, for example, a method of applying, to the parameter $\mu_a$, maximum a posteriori (MAP) estimation, which uses a value that maximizes the posterior distribution and calculating progress of uncertainty (the same is true for other parameters), a method using a double Monte Carlo trial in which the parameter $\mu_a$ is changed by a Monte Carlo method using the parameters $\mu_{\mu a}$, and $\sigma_{\mu a}$, and the like are considered.

Next, the output unit 17 outputs the estimation value of the corrosion of the portion U estimated in step S7, the failure probability estimated in step S8, and the like (step S9). The corrosion estimation device 10 executes the processing shown in FIG. 4 on a portion at which inspection and measurement of corrosion of the vessel H cannot be performed, and performs the estimation of the corrosion state and the calculation of the future failure probability. Thereby, the corrosion state is estimated for all the portions of the vessel H (some of the corrosion states are actually measured), and the future failure probability is calculated for all the portions. The user checks the corrosion state or creates a maintenance plan to prevent a failure or the like due to the corrosion, based on the output information. Next, creation of a maintenance plan to deal with the corrosion will be described.

(Configuration of Maintenance Plan Device)

The maintenance plan device 20 includes a corrosion data acquisition unit 21, a maintenance menu acquisition unit 22, a plan creation unit 23, a storage unit 24, and an output unit 25.

The corrosion data acquisition unit 21 acquires information such as the corrosion initiation life Tc of each portion, the corrosion amount d(t), and the failure probability, which are calculated by the corrosion estimation device 10. The maintenance menu acquisition unit 22 acquires information of a maintenance menu for each portion. The plan creation unit 23 creates a maintenance plan for each portion and a maintenance plan for the whole structure (vessel H) that is an evaluation target. The storage unit 24 stores information required for the maintenance plan. The output unit 25 outputs the created maintenance plan.

(Operation)

Processing of creating the maintenance plan will be described with reference to FIG. 6.

Figure 6:
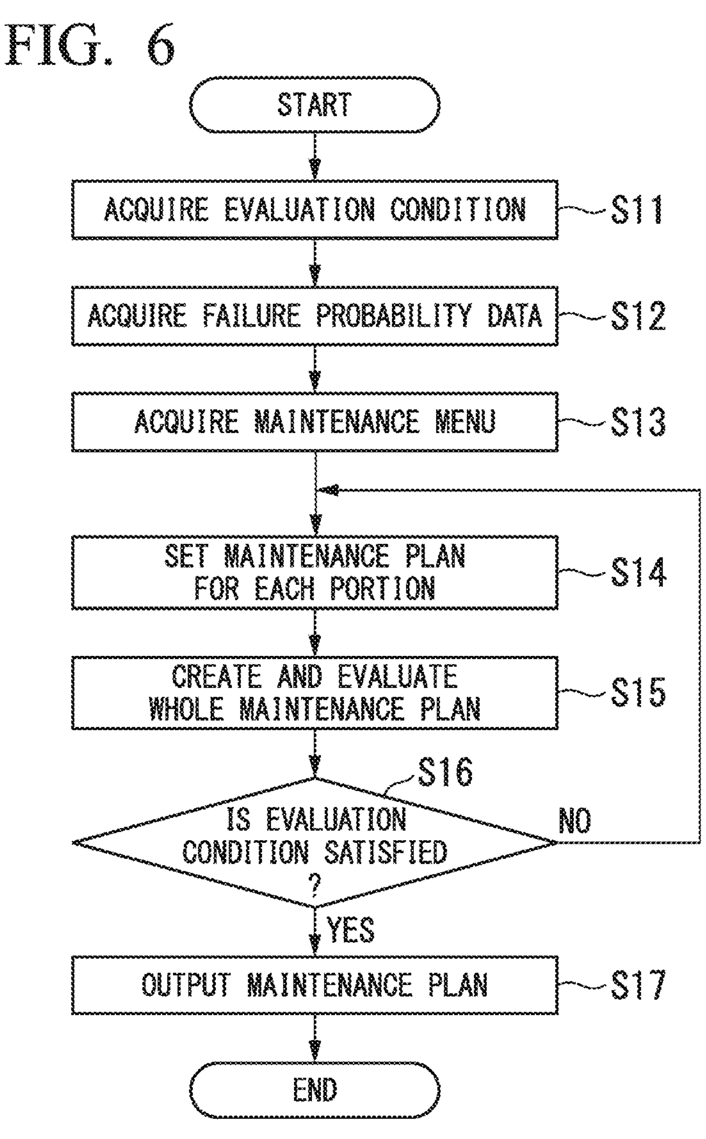
FIG. 6 is a flowchart showing an example of processing of creating a maintenance plan according to the embodiment.

FIG. 6 is a flowchart showing an example of processing of creating the maintenance plan according to the embodiment.

First, the user inputs, to the maintenance plan device 20, an evaluation condition in creation of a maintenance plan, such as reliability of the whole evaluation target, reliability of each portion, an expected value of a cost for each portion, or what to focus on in creation of a maintenance plan (for example, a maintenance plan in which the reliability is equal to or higher than a predetermined value and the total cost is a minimum). The maintenance plan device 20 acquires the input evaluation condition, and records the evaluation condition in the storage unit 24 (step S11).

Next, the corrosion data acquisition unit 21 acquires failure probability data of each portion from the corrosion estimation device 10, and records the data in the storage unit 24 (step S12).

Next, the maintenance menu acquisition unit 22 acquires information of a maintenance menu for each portion (step S13). For example, the maintenance menu includes a method (maintenance menu 1) for performing preventive maintenance on a portion 1 of the vessel H by a method 1, a method (maintenance menu 2) for performing preventive maintenance on a portion 1 of the vessel H by a method 2, . . . , a method (maintenance menu 3) for performing maintenance using a method 3 to deal with a state where thickness reduction of a portion 1 is progressed, . . . , a method (maintenance menu 4) for dealing with a case where a failure occurs in a portion 1 due to corrosion by a method 4 (including replacement parts and spare parts), . . . , and the like. The maintenance menu acquisition unit 22 acquires various maintenance menus for the other portions 2, 3, . . . . The maintenance menu acquisition unit 22 acquires information related to the preventive maintenance cost required in a case where each maintenance menu for each portion is executed (the cost required only for executing a maintenance menu), the degree of improvement of reliability, and the total cost (a cost to deal with a failure in addition to an execution cost of a maintenance menu). The maintenance menu acquisition unit 22 records the acquired information in the storage unit 24.

Figure 5:
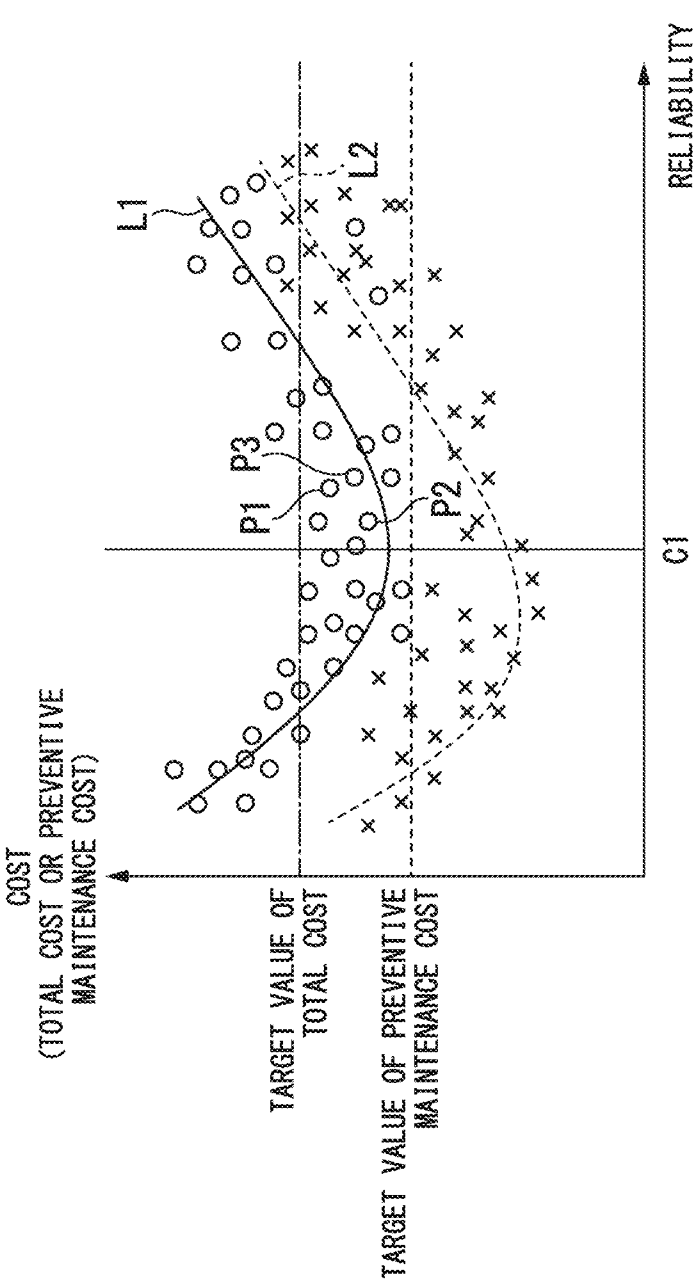
FIG. 5 is a diagram showing the relationship between maintenance cost and reliability according to the embodiment.

Next, the plan creation unit 23 sets a maintenance plan for each portion (step S14). The plan creation unit 23 calculates a combination of maintenance menus that reduce the total cost (or the preventive maintenance cost) while satisfying desired reliability for each portion. For example, the plan creation unit 23 sets a plurality of maintenance plans for each portion, such as a maintenance plan 1 in which, in a predetermined evaluation period, the maintenance menu 1 related to the preventive maintenance is executed once a year during a period until the corrosion initiation life (for example, average value) of the target portion, and thereafter, the maintenance menu 3 is executed once a year, and the maintenance menu 4 is executed during a period for which the failure probability is equal to or higher than a predetermined value, a maintenance plan 2 in which the maintenance menu 1 is executed once every 2 years, the maintenance menu 3 is executed once every 2 years, and, and the like. The plan creation unit 23 calculates a total execution cost of the maintenance menus included in the set maintenance plan. The plan creation unit 23 includes an evaluation model or the like for calculating reliability in a case where the maintenance menus included in each of the maintenance plans 1, 2, are executed, and calculates reliability (for example, average reliability) of the portion during the evaluation period in a case where each maintenance plan is executed, by using the evaluation model. The plan creation unit 23 calculates a cost to deal with a failure in the evaluation period by, for example, multiplying the failure probability in the evaluation period that is indicated by the failure probability data and the cost required in a case where a failure occurs in the portion 1 due to corrosion. The plan creation unit 23 calculates the total cost by adding the cost to deal with the failure and the total execution cost of the preventive maintenance. FIG. 5 shows an example of a relationship between the total cost and the reliability in a case where the plurality of maintenance plans for one portion that are created in this way are executed or a relationship between the preventive maintenance cost and the reliability. One circle mark in FIG. 5 indicates the relationship between the total cost and the reliability in a case where one maintenance plan is executed. The plan creation unit 23 performs regression analysis on the circle marks, and calculates a regression expression L1 indicating the relationship between the total maintenance cost for the portion and the reliability. For example, in a case where the user desires a maintenance plan for the portion in which the reliability is equal to or higher than a certain reference C1 and the total cost is lowest, the plan creation unit 23 selects a maintenance plan corresponding to a certain O mark (for example, P1), and calculates the total cost and the reliability of the maintenance plan. In a case where the reliability of the selected maintenance plan is equal to or higher than C1 and the total cost is equal to or lower than a target value of the total cost, a maintenance menu corresponding to the selected O mark is temporarily set as the maintenance menu for the portion. Alternatively, in a case where there is a maintenance plan in which the reliability is equal to or higher than a reference C1 and the total cost is further reduced, the plan creation unit 23 may select a maintenance plan (P2, P3) based on the regression expression L1.

One cross mark in FIG. 5 indicates the relationship between the preventive maintenance cost and the reliability in a case where one maintenance plan is executed. The plan creation unit 23 performs regression analysis on the cross marks, and calculates a regression expression L2 indicating the relationship between the preventive maintenance cost of the portion and the reliability. For example, in a case where the user desires a maintenance plan in which the reliability is equal to or higher than a certain reference C1 and the preventive maintenance cost is lowest, the plan creation unit 23 selects a maintenance plan that satisfies conditions from the cross marks, and temporarily sets the maintenance plan as a maintenance plan for the portion. The plan creation unit 23 performs the same processing on all the portions, and temporarily sets a maintenance plan for each portion in which the reliability reference is satisfied for each portion and the cost (the total cost or the preventive maintenance cost) is equal to or lower than a target value.

Next, the plan creation unit 23 creates a whole maintenance plan by combining the maintenance menus which are temporarily set for all the portions, and evaluates the created maintenance plan (step S15). The plan creation unit 23 calculates a whole total cost (or preventive maintenance cost) by summing the total costs (or the preventive maintenance costs) of the maintenance plans which are temporarily set for each portion. The plan creation unit 23 calculates the whole reliability by calculating a product of the reliabilities of the maintenance menus which are temporarily set for each portion. The plan creation unit 23 performs optimization of the whole maintenance plan based on the whole total cost (or preventive maintenance cost) and the whole reliability. For example, the plan creation unit 23 calculates, for each of portions 1 to N, a sensitivity of the reliability (for example, a degree of an increase in the whole reliability in a case where the total cost is increased by X yen for each of the portions 1 to N and the maintenance menu according to the total cost is executed), assigns a larger total cost (or preventive maintenance cost) to a portion having higher reliability, and resets the maintenance plan for the portion. The plan creation unit 23 performs the sensitivity evaluation for all portions. The plan creation unit 23 shifts the portion having a high sensitivity of the reliability in a direction in which the total cost (or preventive maintenance cost) is increased, shifts the portion having a low sensitivity of the reliability in a direction in which the current state is maintained or the total cost is decreased, and re-evaluates the whole reliability and the whole total cost (or preventive maintenance cost). The plan creation unit 23 repeatedly performs adjustment of the maintenance plan for each portion and re-calculation of the whole total cost (or preventive maintenance cost) and the whole reliability until the whole total cost (or preventive maintenance cost) and the whole reliability satisfy the evaluation conditions (step S16). The plan creation unit 23 calculates, as a final whole maintenance plan, a combination of the maintenance plans of each portion in a case where the whole total cost (or preventive maintenance cost) and the whole reliability satisfy conditions of the desired reliability and the desired total cost. The output unit 25 outputs the final maintenance plan to a display device or the like (step S17).

(Effect)

As described above, according to the corrosion estimation device 10, it is possible to predict a corrosion initiation life and a corrosion amount of another portion from measurement data of corrosion of a certain portion. Thereby, it is possible to estimate the corrosion state without performing corrosion inspection and corrosion measurement for all portions such as a large structure. Even in a case of a portion where a sensor or the like that detects the corrosion state cannot be provided, it is possible to estimate the corrosion state of the portion. With the corrosion estimation device 10, a corrosion state of an unmeasured portion is predicted as a probability distribution after considering variations in the corrosion initiation life Tc and the corrosion amount d(t). Thus, it is possible to recognize the predicted value of the corrosion state as well as certainty of the corrosion. In the evaluation target, even in a case where there is a doubt on the reliability of the measurement data of the measurement portion, by correcting the measurement data, it is possible to predict a thickness reduction state of the member by taking into account the unreliability of the inspection (an inspection bias and a measurement error). Further, based on the corrosion relational expressions (2) to (5) generated from the measurement data and the corrosion database, it is possible to quantify the future corrosion amount, the failure occurrence probability, and the probability of exceeding corrosion criteria. Thereby, risk management for an operation of the evaluation target can be performed. For example, by using the failure probability, it is possible to estimate a failure risk due to corrosion of a specific portion of interest, and create a reasonable maintenance plan. It is possible to create a maintenance plan to ensure the reliability and the cost for the whole evaluation target.

Figure 7:
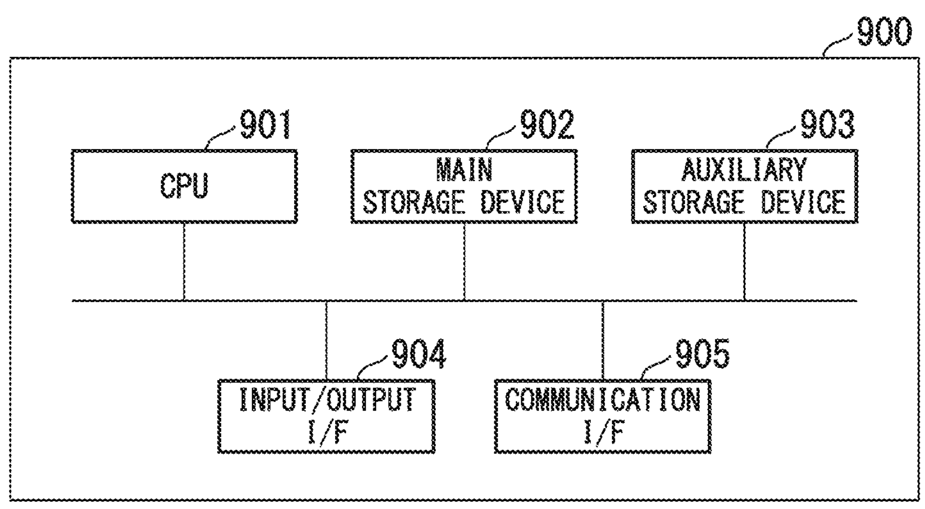
FIG. 7 is a diagram showing an example of a hardware configuration of the corrosion management system according to the embodiment.

FIG. 7 is a diagram showing an example of a hardware configuration of the corrosion management system according to the embodiment.

A computer 900 includes a CPU 901, a main storage device 902, an auxiliary storage device 903, an input/output interface 904, and a communication interface 905, and is connected to a sensor 800.

The corrosion management system 1 described above is implemented in the computer 900. In addition, each function described above is stored in the auxiliary storage device 903 in a form of a program. The CPU 901 reads the program from the auxiliary storage device 903, loads the program to the main storage device 902, and executes the above processing according to the program. The CPU 901 secures a storage area in the main storage device 902 according to the program. The CPU 901 secures a storage area for storing data being processed in the auxiliary storage device 903 according to the program. The measurement value measured by the sensor 800 is input to the computer 900 via the input/output interface 904 or the communication interface 905, and is stored in the auxiliary storage device 903 by processing of the CPU 901.

Processing of each functional unit may be performed by recording a program for realizing all or some of the functions of the corrosion management system 1 on a computer-readable recording medium, and reading and executing the program recorded on the recording medium in the computer system. Here, the "computer system" includes an OS and hardware such as a peripheral device. The "computer system" includes a homepage providing environment (or a display environment) in a case where a WWW system is used. The "computer-readable recording medium" refers to a portable medium such as a CD, a DVD, or a USB, and a storage device such as a hard disk built in the computer system. In a case where this program is distributed to the computer 900 via a communication line, the computer 900, which receives the distribution, may load the program into the main storage device 902 and execute the processing described above. The program may be a program for realizing some of the above-described functions, and, further, may be a program capable of realizing the above-described functions in combination with a program already recorded in a computer system.

As described above, some embodiments of the present disclosure have been described, but all of these embodiments are merely examples, and are not intended to limit the scope of the present invention. These embodiments can be implemented in various other forms, and various omissions, replacements, and changes can be made without departing from the gist of the invention. The embodiments or modifications thereof are included in the scope or the concept of the invention, and are also included in the scope of the invention described in the appended claims and an equivalent scope thereof.

APPENDIX

The corrosion management system, the estimation method, and the program described in the embodiment are understood, for example, as follows.

(1) According to a first aspect, there is provided a corrosion management system 1 including: a measurement data acquisition unit 11 that acquires measurement data indicating a corrosion state of a first portion (portion S) of a structure (a vessel H) which is an evaluation target; and a corrosion estimation unit 13 that estimates a corrosion state (a corrosion initiation life, a corrosion amount) of a second portion (portion U) of the evaluation target based on relational expressions (2) to (5) between the corrosion state of the first portion and the corrosion state of the second portion and the measurement data of the first portion.

Thereby, it is possible to estimate the corrosion state of an unmeasured portion.

(2) According to a second aspect, the corrosion management system 1 according to (1) further includes: a relational expression calculation unit 12 that calculates the relational expression based on parameters (Tc, a, and b registered in the corrosion database) analyzed from the measurement data of the first portion and the second portion of another structure (another vessel registered in a corrosion database) different from the structure.

The relational expressions (2) to (5) can be calculated by the measurement data of the first portion and the second portion of another structure.

(3) According to a third aspect, in the corrosion management system 1 according to (2), the parameters are A and B in a prediction expression $Y=AX^B$ of a corrosion progress amount in a case where it is assumed that a corrosion initiation life is Tc, a corrosion amount is Y, and a time is X.

For many structures, these values are published. The relational expressions can be calculated using the published values.

(4) According to a fourth aspect, the corrosion management system 1 according to (1) to (3) further includes: a measurement data correction unit that corrects the measurement data of the first portion based on the measurement data and the measurement data measured at the first portion of past another structure.

Thereby, even in a case where there is concern on the reliability of the measurement data of the first portion, it is possible to ensure the reliability of the measurement data and to ensure accuracy of the estimation value of the corrosion state of the second portion.

(5) According to a fifth aspect, in the corrosion management system 1 according to (1) to (4), the relational expression is either or both of a relational expression that is based on an addition rule and indicates that an amount indicating the corrosion state of the second portion is equal to an amount obtained by adding a correction amount to an amount indicating the corrosion state of the first portion, and a relational expression that is based on a multiplication rule and indicates that the amount indicating the corrosion state of the second portion is equal to an amount obtained by multiplying the amount indicating the corrosion state of the first portion by the correction amount.

By formulating both the relational expression based on the addition rule and the relational expression based on the multiplication rule, even in a case where there is a problem in the estimation accuracy of one of the relational expressions, the corrosion state of an unmeasured portion can be estimated by the other relational expression.

(6) According to a sixth aspect, in the corrosion management system 1 according to (1) to (5), the relational expression includes a first relational expression indicating the relationship between the corrosion initiation life of the first portion and the corrosion initiation life of the second portion, and a second relational expression indicating the relationship between the corrosion progress amount of the first portion and the corrosion progress amount of the second portion.

Accordingly, it is possible to estimate a corrosion initiation life and a corrosion extension amount as the corrosion state of the second portion (two-stage corrosion model).

(7) According to a seventh aspect, the corrosion management system 1 according to (1) to (6) further includes: a failure probability calculation unit that predicts a probability that the corrosion progress amount of the second portion exceeds a threshold value by using the second relational expression.

By calculating a failure probability due to corrosion, a maintenance plan for the corrosion can be examined.

(8) According to an eighth aspect, the corrosion management system 1 according to (1) to (7) further includes: a plan creation unit 23 that creates a first maintenance plan for corrosion of the first portion and a second maintenance plan for corrosion of the second portion based on the corrosion state of the first portion and the corrosion state of the second portion.

It is possible to create a maintenance plan according to a corrosion status for each portion.

(9) According to a ninth aspect, the corrosion management system 1 according to (8), the plan creation unit calculates a first cost related to the first maintenance plan and a first reliability that is a reliability of the first portion and is achieved by the first maintenance plan, calculates a second cost related to the second maintenance plan and a second reliability that is a reliability of the second portion and is achieved by the second maintenance plan, calculates a third cost and a third reliability related to a third maintenance plan created for all portions other than the first portion and the second portion of the evaluation target, calculates a total cost that is a sum of the first cost, the second cost, and the third cost and a whole reliability that is a product of the first reliability, the second reliability, and the third reliability, and adjusts at least one of the first maintenance plan, the second maintenance plan, or the third maintenance plan such that either or both of the total cost and the whole reliability satisfy a predetermined reference.

Thereby, it is possible to create an optimized whole maintenance plan while corresponding to corrosion of each portion.

(10) According to a tenth aspect, there is provided an estimation method including: a step of acquiring measurement data indicating a corrosion state of a first portion of a structure which is an evaluation target; and a step of estimating a corrosion state of a second portion of the evaluation target based on a relational expression between the corrosion state of the first portion and the corrosion state of the second portion, and the measurement data of the first portion.

(11) According to an eleventh aspect, there is provided a program causing a computer 900 to execute a process including: a step of acquiring measurement data indicating a corrosion state of a first portion of a structure which is an evaluation target; and a step of estimating a corrosion state of a second portion of the evaluation target based on a relational expression between the corrosion state of the first portion and the corrosion state of the second portion, and the measurement data of the first portion.

INDUSTRIAL APPLICABILITY

According to the corrosion management system, the estimation method, and the program described above, it is possible to estimate a corrosion state of an unmeasured point. It is possible to create an effective maintenance plan to deal with the estimated corrosion.

REFERENCE SIGNS LIST

1: corrosion management system
10: corrosion estimation device
11: measurement data acquisition unit
12: relational expression calculation unit
13: corrosion estimation unit
14: measurement data correction unit
15: failure probability calculation unit
16: storage unit
17: output unit
20: maintenance plan device
21: corrosion data acquisition unit
22: maintenance menu acquisition unit
23: plan creation unit
24: storage unit
25: output unit
900: computer
901: CPU
902: main storage device
903: auxiliary storage device
904: input/output interface
905: communication interface

What is claimed is:

1. A corrosion management system comprising:

at least one memory configured to store instructions; and at least one processor configured to execute the instructions to:

acquire measurement data indicating a corrosion state of a first portion of a structure which is an evaluation target;

determine whether the acquired measurement data whether to correct the measurement data based on reliability of the measurement data;

correct the measurement data in response to a determination that the measurement data is unreliable; and estimate a corrosion state of a second portion of the evaluation target based on a relational expression between the corrosion state of the first portion and the corrosion state of the second portion, and one of the measurement data of the first portion or the corrected measurement data of the first portion, wherein the relational expression includes a first relational expression indicating a relationship between a corrosion initiation life of the first portion and a corrosion initiation life of the second portion, and a second relational expression indicating a relationship between a corrosion progress amount of the first portion and a corrosion progress amount of the second portion.

2. The corrosion management system according to claim 1, wherein the relational expression is either or both of a relational expression that is based on an addition rule and indicates that an amount indicating the corrosion state of the second portion is equal to an amount obtained by adding a correction amount to an amount indicating the corrosion state of the first portion, and a relational expression that is based on a multiplication rule and indicates that the amount indicating the corrosion state of the second portion is equal to an amount obtained by multiplying the amount indicating the corrosion state of the first portion by the correction amount.

3. The corrosion management system according to claim 1, wherein the at least one processor is further configured to execute the instructions to predict a probability that the corrosion progress amount of the second portion exceeds a threshold value by using the second relational expression.

4. The corrosion management system according to claim 1, wherein the at least one processor is further configured to execute the instructions to output the estimated corrosion state of the second portion to a display device.

5. The corrosion management system according to claim 1, wherein the structure is a vessel, and the first portion and the second portion are different structural members of the vessel.

6. The corrosion management system according to claim 1, wherein the at least one processor is further configured to execute the instructions to calculate:

the relational expression based on parameters analyzed from the measurement data of the first portion and the second portion of another structure different from the structure.

7. The corrosion management system according to claim 6, wherein the parameters correspond to A and B in a prediction expression $Y=AX^B$ of a corrosion progress amount, where Y is a corrosion amount, and X is a time.

8. The corrosion management system according to claim 1, wherein the at least one processor is further configured to execute the instructions to create a first maintenance plan for corrosion of the first portion and a second maintenance plan for corrosion of the second portion based on the corrosion state of the first portion and the corrosion state of the second portion.

9. The corrosion management system according to claim 8, wherein the at least one processor is further configured to execute the instructions to calculate a first cost related to the first maintenance plan and a first reliability that is a reliability of the first portion and is achieved by the first maintenance plan, calculates a second cost related to the second maintenance plan and a second reliability that is a reliability of the second portion and is achieved by the second maintenance plan, calculates a third cost and a third reliability related to a third maintenance plan created for all portions other than the first portion and the second portion of the evaluation target, calculates a total cost that is a sum of the first cost, the second cost, and the third cost and a whole reliability that is a product of the first reliability, the second reliability, and the third reliability, and adjusts at least one of the first maintenance plan, the second maintenance plan, or the third maintenance plan such that either or both of the total cost and the whole reliability satisfy a predetermined reference.

10. An estimation method comprising:

acquiring measurement data indicating a corrosion state of a first portion of a structure which is an evaluation target;

determining whether the acquired measurement data whether to correct the measurement data based on reliability of the measurement data;

correcting the measurement data in response to a determination that the measurement data is unreliable; and estimating a corrosion state of a second portion of the evaluation target based on a relational expression between the corrosion state of the first portion and the corrosion state of the second portion, and one of the measurement data of the first portion or the corrected measurement data of the first portion, wherein the relational expression includes a first relational expression indicating a relationship between a corrosion initiation life of the first portion and a corrosion initiation life of the second portion, and a second relational expression indicating a relationship between a corrosion progress amount of the first portion and a corrosion progress amount of the second portion.

11. The estimation method according to claim 10, further comprising a step of outputting the estimated corrosion state of the second portion to a display device.

12. The estimation method according to claim 10, wherein the structure is a vessel, and the first portion and the second portion are different structural members of the vessel.

13. A non-transitory storage medium that stores a program causing a computer to execute a process comprising:

acquiring measurement data indicating a corrosion state of a first portion of a structure which is an evaluation target;

determining whether the acquired measurement data whether to correct the measurement data based on reliability of the measurement data;

correcting the measurement data in response to a determination that the measurement data is unreliable; and estimating a corrosion state of a second portion of the evaluation target based on a relational expression between the corrosion state of the first portion and the corrosion state of the second portion, and one of the measurement data of the first portion or the corrected measurement data of the first portion, wherein the relational expression includes a first relational expression indicating a relationship between a corrosion initiation life of the first portion and a corrosion initiation life of the second portion, and a second relational expression indicating a relationship between a corrosion progress amount of the first portion and a corrosion progress amount of the second portion.

14. The non-transitory storage medium according to claim 13, wherein the process further comprises a step of outputting the estimated corrosion state of the second portion to a display device.

15. The non-transitory storage medium according to claim 13, wherein the structure is a vessel, and the first portion and the second portion are different structural members of the vessel.

* * * * *